US011255637B2

(12) United States Patent
Delz et al.

(10) Patent No.: US 11,255,637 B2
(45) Date of Patent: Feb. 22, 2022

(54) RIFLESCOPE ADJUSTMENT SYSTEMS

(71) Applicant: Gunwerks, LLC, Cody, WY (US)

(72) Inventors: Mark Delz, Round Rock, TX (US); Christopher Thomas, Cody, WY (US); Andreas Schaefer, Hohenahr (DE)

(73) Assignee: GUNWERKS, LLC, Cody, WY (US)

( * ) Notice: Subject to any disclaimer, the term of this patent is extended or adjusted under 35 U.S.C. 154(b) by 637 days.

(21) Appl. No.: 15/962,096

(22) Filed: Apr. 25, 2018

(65) Prior Publication Data
US 2018/0313633 A1 Nov. 1, 2018

Related U.S. Application Data

(60) Provisional application No. 62/491,717, filed on Apr. 28, 2017.

(51) Int. Cl.
*F41G 1/38* (2006.01)
*G02B 23/14* (2006.01)
(Continued)

(52) U.S. Cl.
CPC .............. *F41G 1/38* (2013.01); *G02B 23/14* (2013.01); *G01B 7/003* (2013.01); *G01B 7/24* (2013.01); *G02B 27/36* (2013.01)

(58) Field of Classification Search
CPC .. F41G 1/38; G01B 7/003; G01B 7/24; G01B 7/30; G02B 23/14; G02B 27/36
See application file for complete search history.

(56) References Cited

U.S. PATENT DOCUMENTS

| 4,745,363 A * | 5/1988 | Carr ........................ G01P 3/488 324/207.2 |
| 5,472,383 A | 12/1995 | McKibbin |

(Continued)

FOREIGN PATENT DOCUMENTS

DE 202008008630 U1 9/2008

OTHER PUBLICATIONS

"MicroSquirt Dual Spark" [online], Jan. 14, 2017 [retrieved on Jun. 27, 2018] <URL: https://web.archive.org/web/20170114041935/http://www.useasydocs.com/details/dualspark.htm.
(Continued)

*Primary Examiner* — Michelle Clement
(74) *Attorney, Agent, or Firm* — Dorsey & Whitney LLP

(57) ABSTRACT

An adjustment assembly having a rotary encoder, riflescopes incorporating the same, and related methods are provided. In one example, an adjustment assembly includes a first rotational component configured to rotate about an axis, a first gear coupled with the first rotational component and a second gear coupled with the first rotational component. The assembly further includes an encoder. The encoder includes a position gear engaged with the first gear, the first gear and the position gear having a 1:1 gear ratio, and a revolution gear engaged with the second gear, the second gear and the revolution gear having a gear ratio other than 1:1, wherein the gear ratio of the second gear and the revolution gear independent of a ratio of the respective diameters of the second gear and the revolution gear. Sensors may determine the rotational positions of the position sensor and the revolution sensors.

13 Claims, 9 Drawing Sheets

(51) Int. Cl.
*G01B 7/24* (2006.01)
*G01B 7/00* (2006.01)
*G02B 27/36* (2006.01)

(56) References Cited

U.S. PATENT DOCUMENTS

| | | | |
|---|---|---|---|
| 6,503,123 B2 | 1/2003 | Chung | |
| 6,508,026 B1 | 1/2003 | Uppiano et al. | |
| 6,862,832 B2* | 3/2005 | Barrett | F41G 1/38 |
| | | | 42/119 |
| 8,468,930 B1* | 6/2013 | Bell | F41G 1/38 |
| | | | 89/204 |
| 8,713,843 B2* | 5/2014 | Windauer | F41G 1/38 |
| | | | 42/113 |
| 9,151,570 B2* | 10/2015 | Plaster | F41G 1/38 |
| 10,175,031 B2* | 1/2019 | VanBecelaere | G02B 27/40 |
| 10,180,565 B2* | 1/2019 | Havens | G02B 9/60 |
| 10,480,901 B2* | 11/2019 | Thomas | G02B 23/14 |
| 10,534,166 B2* | 1/2020 | Summerfield | G02B 27/142 |
| 2004/0070392 A1 | 4/2004 | Hahn | |
| 2004/0088898 A1* | 5/2004 | Barrett | F41G 1/38 |
| | | | 42/119 |
| 2008/0039962 A1* | 2/2008 | McRae | G01S 17/88 |
| | | | 700/90 |
| 2008/0202198 A1* | 8/2008 | Davidson | F41G 3/12 |
| | | | 73/1.75 |
| 2009/0266892 A1* | 10/2009 | Windauer | F41G 1/40 |
| | | | 235/404 |
| 2011/0162250 A1* | 7/2011 | Windauer | G05G 5/12 |
| | | | 42/119 |
| 2012/0186131 A1* | 7/2012 | Windauer | F41G 1/38 |
| | | | 42/122 |
| 2013/0167425 A1* | 7/2013 | Crispin | F41G 1/16 |
| | | | 42/119 |
| 2013/0199074 A1* | 8/2013 | Paterson | F41G 3/06 |
| | | | 42/122 |
| 2014/0101982 A1* | 4/2014 | McPhee | F41G 1/44 |
| | | | 42/130 |
| 2015/0106046 A1* | 4/2015 | Chen | F41G 1/473 |
| | | | 702/94 |
| 2015/0247702 A1* | 9/2015 | Davidson | G02B 23/14 |
| | | | 42/122 |

OTHER PUBLICATIONS

Follow Focus FF-5 [online], Feb. 26, 2017 [retrieved on Jun. 27, 2018] <URL: https://web.archive.org/web/20170226074145/http://www.arri.com/camera/pro_camera_accessories/learn/faq_follow_focus/.
International Search Report and Written Opinion for corresponding PCT Application No. PCT/US2018/029416, dated Jul. 23, 2018.

* cited by examiner

RIFLESCOPE ADJUSTMENT SYSTEMS

CROSS REFERENCE TO RELATED APPLICATIONS

This claims priority to U.S. Provisional Patent Application No. 62/491,717 filed 28 Apr. 2017, the entire contents of which is hereby incorporated by reference into this disclosure.

BACKGROUND

Firearms such as rifles are used for a variety of purposes, including for sport, military and other protective services. Oftentimes, rifles are used to shoot targets at long distances (e.g., 100 yards or more) and even very long ranges (e.g., in excess of 500 yards). In order to accommodate the sighting of a target at such ranges, riflescopes are often employed. A riflescope includes optics that magnify the view of the target and also help to aim the rifle for purposes of accuracy and precision. For example, a riflescope may include a reticle or other aiming point positioned in the field of view that is provided by the optics of the riflescope, the aiming point being aligned with a target by a user prior to firing the rifle.

Factors such as bullet drop (i.e., the influence of gravity on a moving bullet), the Magnus effect, the Coriolis effect, ballistics specific considerations, as well as other factors may impact the path of a bullet when fired over relatively long distances. Thus, the ability to compensate for these factors by positioning the aiming point of the riflescope has been an important aspect in long range shooting.

Adjustment assemblies, such as elevation or windage turrets, may be used to alter the position of an aiming point so that a shooter may position the aiming point relative to the rifle in order to compensate for one or more of the above-described factors that affect the travel of a bullet during its flight toward the target. Determining the rotational position of a turret knob conventionally requires a user to remove their eye from the view of the riflescope view in order to review and interpret indicia markings on the turret knob.

It is a desire within the industry to provide enhanced optics that provide a user with an improved viewing experience including the provision of information relating to the state and performance of their optics device.

BRIEF SUMMARY OF THE INVENTION

Embodiments of the present disclosure provide optical devices, such as a riflescope, having one or more adjustment assemblies. The adjustment assemblies may include an encoder configured to determine a rotational position of one or more components of the assembly.

In accordance with one embodiment, an adjustment assembly for a riflescope is provided. The assembly comprises a first rotational component configured to rotate about an axis, a first gear coupled with the first rotational component, a second gear coupled with the first rotational component, and an encoder. The encoder includes a position gear eccentrically engaged with the first gear, the first gear and the position gear having a 1:1 gear ratio. The encoder further includes a revolution gear eccentrically engaged with the second gear, the second gear and the revolution gear having a gear ratio other than 1:1. Additionally, the gear ratio of the second gear and the revolution gear is independent of a ratio of a diameter of the second gear and a diameter of the revolution gear. A first sensor is located and configured to sense the rotational position of the position gear, and a second sensor located and configured to sense the rotational position of the revolution gear.

In one embodiment, the diameter of the revolution gear is smaller than the diameter of the second gear while the gear ratio of the second gear to the revolution gear is greater than 1:1.

In one embodiment, the second gear includes a single tooth and the revolution gear includes multiple teeth.

In one embodiment, the position gear and the revolution gear each include diametric magnets and the first sensor and the second sensor each include Hall effect sensors.

In one embodiment, the first rotational component includes a nut.

In one embodiment, the assembly further comprises a bolt, wherein the bolt is threadedly coupled with the nut such that, upon rotation of the nut about the axis, the bolt translates along the axis.

In one embodiment, the assembly further comprises a knob coupled with the nut.

In one embodiment, the nut, the first gear, the second gear, and the encoder are housing within an interior portion of the knob.

In one embodiment, a plurality of incremental markings are provided on an exterior portion of the knob.

In accordance with another embodiment, a riflescope is provided including a main tube, an objective system coupled to a first end of the main tube, an ocular system coupled to a second end of the main tube, and an optical element is disposed in the main tube. An adjustment assembly is configured to alter a position of the optical element within the main tube, wherein the adjustment assembly comprises a first rotational component configured to rotate about an axis, a first gear coupled with the first rotational component, a second gear coupled with the first rotational component, and an encoder. The encoder comprises a position gear eccentrically engaged with the first gear, the first gear and the position gear having a 1:1 gear ratio and a revolution gear eccentrically engaged with the second gear, the second gear and the revolution gear having a gear ratio other than 1:1. The gear ratio of the second gear and the revolution gear is independent of a ratio of a diameter of the second gear and a diameter of the revolution gear. A first sensor is located and configured to sense the rotational position of the position gear, and a second sensor located and configured to sense the rotational position of the revolution gear.

In one embodiment, the diameter of the revolution gear is smaller than the diameter of the second gear, while the gear ratio of the second gear to the revolution gear is greater than 1:1.

In one embodiment, the second gear includes a single tooth and the revolution gear includes multiple teeth.

In one embodiment, the position gear and the revolution gear each include diametric magnets and wherein the first sensor and the second sensor each include Hall effect sensors.

In one embodiment, the riflescope further comprises a control module and a display in communication with the control module, wherein the encoder is in communication with the control module and the display presents indicia representative of a rotational position of the first rotational component.

In one embodiment, the adjustment assembly is configured as at least one of an elevational turret and a windage turret.

In one embodiment, the optical element includes an erector tube.

In accordance with another embodiment, an adjustment assembly for a riflescope is provided, the assembly comprising a first rotational component configured to rotate about an axis, a first gear coupled with the first rotational component, a second gear coupled with the first rotational component, the second gear having a single tooth, a position gear eccentrically engaged with the first gear, and a revolution gear eccentrically engaged with the second gear, the second gear having a plurality of teeth.

In one embodiment, the first gear and the position gear have a 1:1 gear ratio.

In one embodiment, the assembly further comprises a first sensor configured to sense the rotational position of the position gear, and a second sensor configured to sense the rotational position of the revolution gear.

In one embodiment, the position gear and the revolution gear each include diametric magnets and the first sensor and the second sensor each include Hall effect sensors.

Another aspect of the disclosure relates to an adjustment assembly for a riflescope, wherein the assembly may comprise a rotational component configured to rotate about an axis, a linear component translatable along the axis in response to rotation of the rotational component, and an encoder. The encoder may include a first sensor to sense an angular displacement of the rotational component about the axis relative to a zero point and a second sensor to sense complete revolutions of the rotational component about the axis. The encoder may be configured to output a total angular displacement which may be based on the angular displacement of the rotational component about the axis relative to the zero point and the complete revolutions of the rotational component about the axis.

In some embodiments the first sensor may comprise a gear and a rotational sensor to sense a rotational position of the gear, with the gear being rotatable by rotation of the rotational component about the axis. In some configurations the gear and the rotational component may have a 1:1 gear ratio.

In some embodiments the first sensor may be configured to sense an angular displacement having a value less than one revolution relative to the zero point.

In some embodiments, the second sensor may comprise a gear and a rotational sensor to sense a rotational position of the gear, with the gear being rotatable by rotation of the rotational component about the axis. The gear and the rotational component may have a gear ratio, with the gear ratio being independent of a ratio of a first diameter of the gear and a second diameter of the rotational component. The gear and the rotational component may have a gear ratio greater than 1:1.

In some embodiments the second sensor may comprise only one tooth and the rotational component may comprise a plurality of teeth configured to engage the tooth of the second sensor.

In some embodiments, the second sensor may comprise a magnetic sensor to sense a change in a magnetic field originating in the linear component or the rotational component.

The adjustment assembly by also further comprise a knob, wherein the rotational component and the encoder are positioned within an interior portion of the knob.

Another aspect of the disclosure relates to a riflescope, comprising a main tube, an objective system coupled to a first end of the main tube, an ocular system coupled to a second end of the main tube, an optical element disposed in the main tube, and an adjustment assembly operable to alter a position of the optical element relative to the main tube. The adjustment assembly may comprise: a rotational component configured to rotate about an axis and an encoder. The encoder may include a first sensor to sense an angular displacement of the rotational component about the axis relative to a zero point and a second sensor to sense complete revolutions of the rotational component about the axis. The encoder may be configured to output a total angular displacement, with the total angular displacement being based on the angular displacement of the rotational component about the axis relative to the zero point and the complete revolutions of the rotational component about the axis.

In some embodiments the adjustment assembly may be part of an elevational adjustment assembly, a windage adjustment assembly, or a parallax dial assembly.

In some embodiments, the first sensor may comprise a first gear engaged with the rotational component and the second sensor may comprise a second gear engaged with the rotational component. The first gear may be engaged with a first set of teeth of the rotational component and the second gear may be engaged with a second set of teeth of the rotational component, with the first set of teeth being offset along the axis relative to the second set of teeth. The first and second gears may each include diametric magnets.

In some embodiments at least the second sensor may comprise a magnetic sensor to sense a change in a magnetic field through a linear component, with the linear component being translatable along the axis in response to rotation of the rotational component.

In some configurations the riflescope further comprises a control module and a display in communication with the control module, wherein the encoder may be in communication with the control module and the display may present indicia representative of a rotational position of the rotational component about the axis.

Another aspect of the disclosure relates to a method, comprising: providing a riflescope having a main body and an optical element and coupling an adjustment assembly to the riflescope, with the adjustment assembly being configured to adjust the optical element relative to the main body. The adjustment assembly may be rotatable about an axis, and rotation of the adjustment assembly about the axis may be measurable by an encoder. The encoder may have a first sensor to measure a first angular rotation value of the adjustment assembly about the axis, and the encoder may have a second sensor to measure a second angular rotation value of the adjustment assembly about the axis. The first angular rotation value may be an angular displacement of the adjustment assembly less than one complete revolution about the axis, and the second angular rotation value may be a number of complete revolutions about the axis. The method may also include configuring a total angular rotation value of the adjustment assembly to be visible, the total angular rotation value being based on the first and second angular rotation values.

In some embodiments the method may further comprise providing the adjustment assembly with the first sensor having a first gear engaging a rotational component of the adjustment assembly and with the second sensor having a second gear engaging the rotational component of the adjustment assembly. The method may also comprise providing the adjustment assembly with the second sensor having a magnetic sensor, with the magnetic sensor being configured to sense angular displacement of a rotational component of the adjustment assembly.

Features, components, steps or aspects of one embodiment described herein may be combined with features, components, steps or aspects of other embodiments without limitation.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Embodiments of an optical device, such as a riflescope, along with related components, systems, and methods are provided herein. According to various embodiments, a riflescope may have one or more adjustment assemblies that include an encoder to determine or track the status of the adjustment assembly. In certain embodiments, the encoder is configured to determine the position of a rotatable component, including the number of complete revolutions the rotatable component has made about a defined axis as well as any partial revolution. Such an encoder may be used, for example, with a so-called windage turret or an elevational turret, although it may be incorporated into other assemblies as well.

Figure 1:
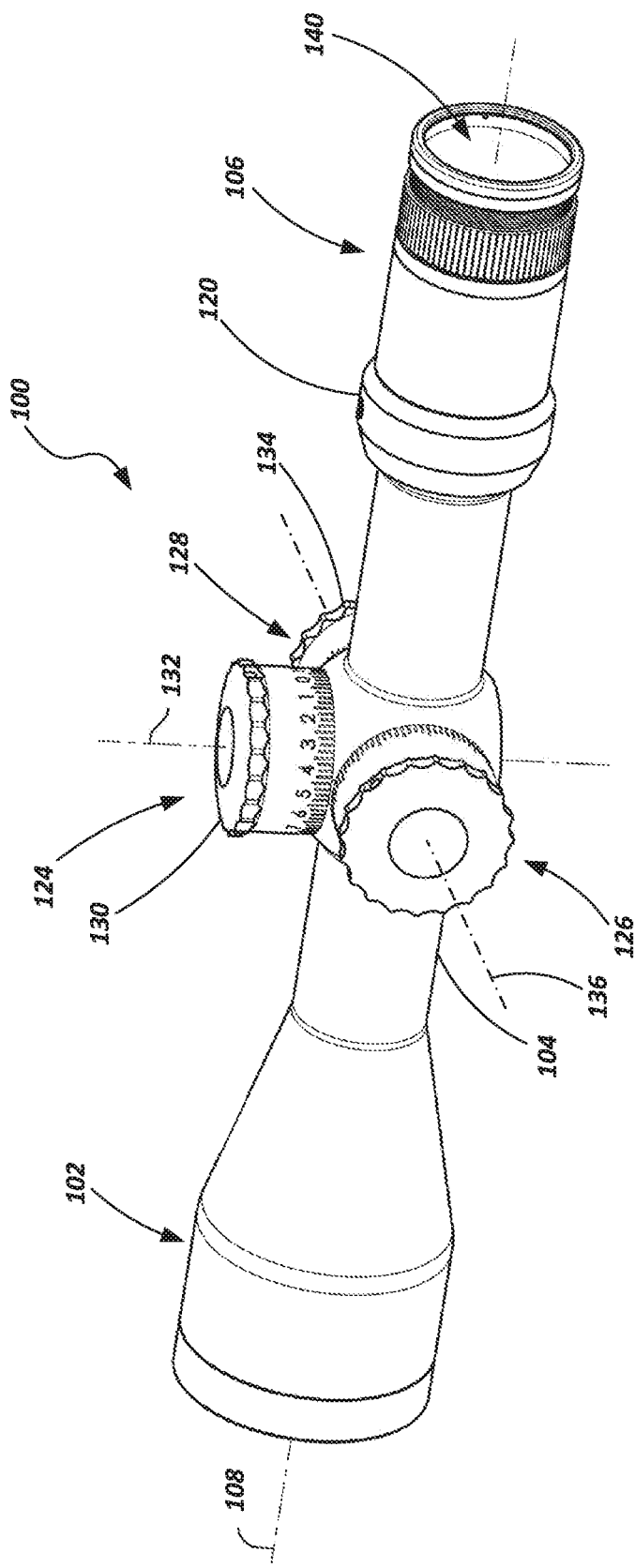
FIG. 1 is a perspective view of a riflescope according to an embodiment of the disclosure.
Figure 2:
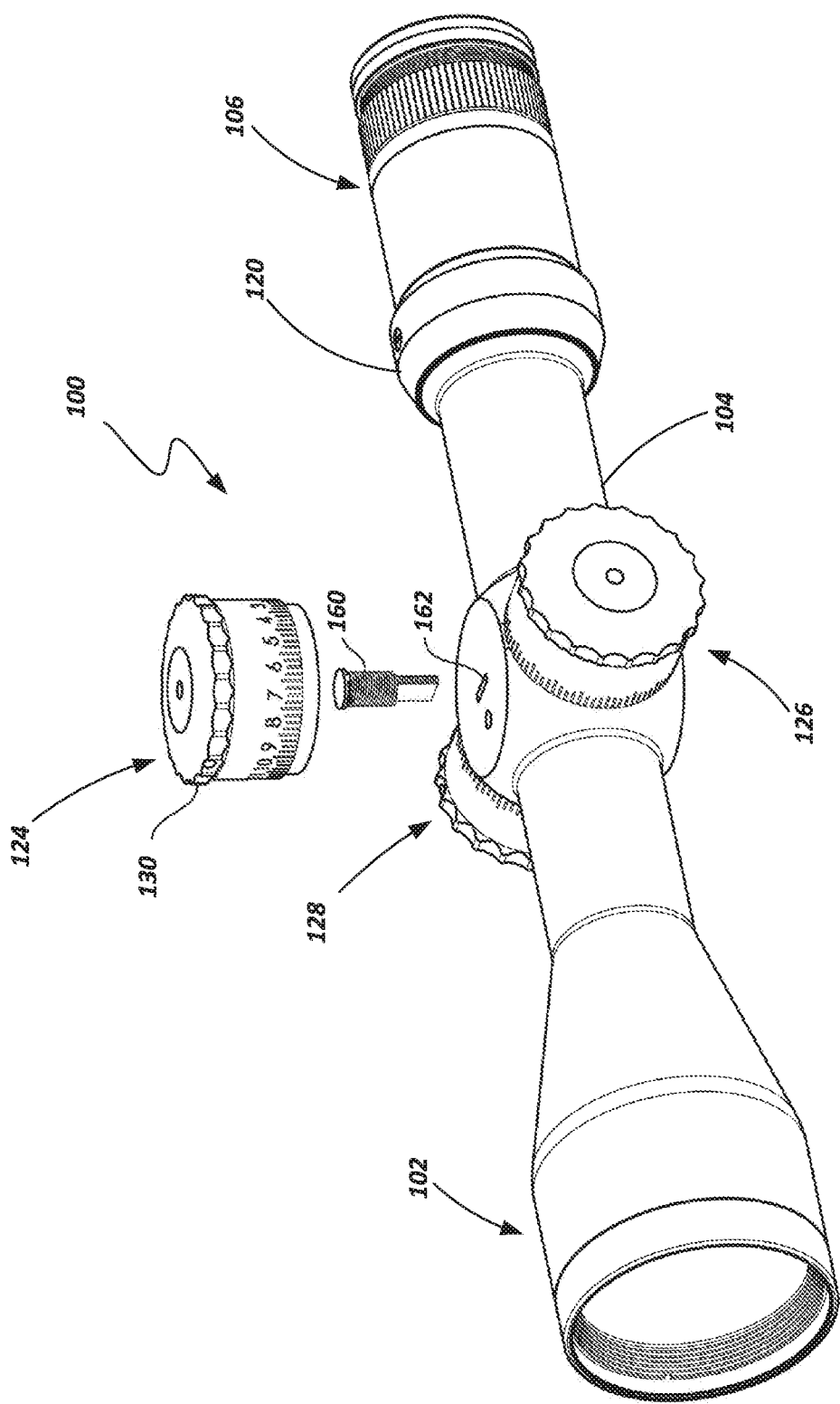
FIG. 2 is another perspective and partially exploded view of the riflescope shown in FIG. 1.
Figure 3:
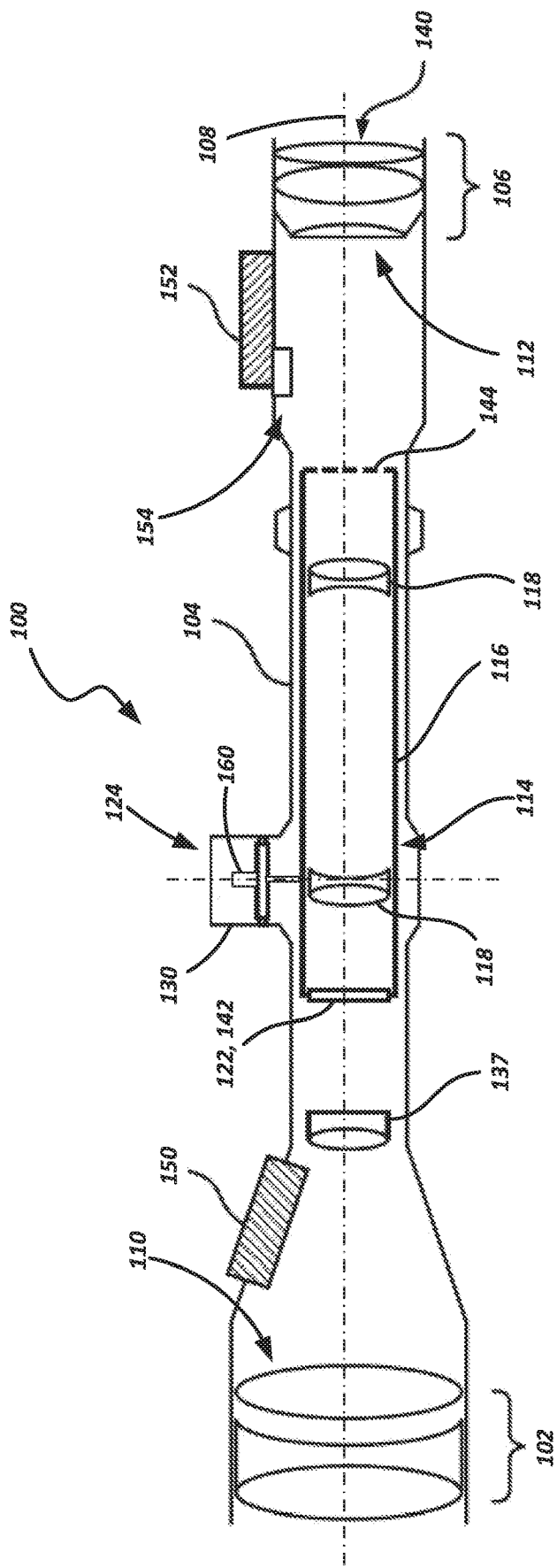
FIG. 3 is a schematic view of a riflescope illustrating the optics train according to an embodiment of the present disclosure.

Referring to FIGS. 1-3, a riflescope 100 is shown in accordance with an embodiment of the present disclosure. The riflescope 100 may include an objective system 102, a main tube 104, and an ocular system 106 arranged along an optical axis 108. The objective system 102 may include one or more lenses 110 and is positioned at the distal end of the riflescope 100 (i.e., the farthest away from a user's eye during use). The ocular system 106 also may include one or more lenses 112 and may be located at a proximal end of the riflescope 100. A plurality of optical elements may also be disposed within the main tube 104. For example, an erector system 114, including an erector tube 116 and various lenses or other optical elements 118, may be contained within the main tube 104 to invert the image so that a user sees the image in a "right side up" orientation when looking through the riflescope 100. A magnification ring 120 (also referred to as a power ring) may be used to vary the magnification of the image being viewed though riflescope by adjusting the relative position of various optical elements disposed within the riflescope 100.

In some embodiments, the target view seen through the riflescope 100 by a user may be overlaid with an image of a reticle 122 (e.g., a shape or pattern providing an aiming point within the user's view). In one embodiment, the reticle 122 may be placed within the first focal plane of the riflescope 100 (see, e.g., FIG. 3). The reticle 122 may be constructed from optical material, such as optical glass or plastic or similar transparent material, and/or may take the form of a disc or wafer with substantially parallel sides. The reticle 122 may, for example, be constructed from wire, nano-wires, an etching, or may be analog or digitally printed, or may be projected (for example, on a surface) by, for example, a mirror, video, holographic projection, or other suitable means on one or more wafers of material. In some embodiments, the reticle 122 may include an illuminated reticle. An illuminated reticle may be etched into an optical surface, the etching being backfilled in with a reflective material such as, for example, titanium oxide, that illuminates when a light or diode powered by, for example, a battery, chemical, or photovoltaic source, is rheostatically switched on.

The riflescope 100 may also include a number of adjustment mechanisms including, for example, an elevation adjustment assembly 124, a parallax dial assembly 126, and a windage adjustment assembly 128. The elevation adjustment assembly 124, parallax dial assembly 126, and windage adjustment assembly 128 may each be referred to as turrets. The elevation adjustment assembly 124 may be used to adjust the vertical position of a reticle 122 within the body of the riflescope 100 by rotation of the associated knob 130 relative to the main tube 104 about a rotational axis 132 (see FIGS. 1 and 4) Likewise, the windage adjustment assembly 128 may be used to adjust the horizontal position of reticle 122 within the body of the riflescope by rotation of an associated knob 134 relative to the main tube 104 about a rotational axis 136 (see FIG. 1). The parallax dial assembly 126 may be used to adjust target focus and/or correct parallax (e.g., such as by repositioning a focus lens 137) by rotation about the rotational axis 132. The optical axis 108 and the two rotational axes 132 and 136 may be oriented orthogonally with respect to each other (see FIGS. 1 and 3).

The ocular system 106 may include an eyepiece 140 through which the user may view a target through the riflescope 100. In some embodiments, the ocular system 106 may be adjusted to correct for the user's vision (sometimes referred to as a diopter adjustment). For example, the ocular system 106, or a portion thereof, may be rotated or adjusted relative to the main tube 104 to change the focus of the riflescope 100. In some embodiments, once adjusted, the ocular system 106 (or adjusted portion thereof) may be locked into place with a locking ring or other mechanism.

The various optical elements (e.g., lenses associated the objective system 102, the focus lens 136 and the erector system 114) may be arranged to provide a first focal plane 142 and a second focal plane 144 (see FIG. 3). In other words, light rays may converge to provide an "in focus" image at the focal planes 142, 144. Conventionally, the image at the first focal plane 142 may be vertically inverted due to the arrangement of lenses in the objective system 102, and the image at the second focal plane 144 may be in an "upright" or non-vertically-inverted orientation, i.e., an orientation that a user would expect to see the target with the naked eye and without the aid of the riflescope 100.

As shown in FIG. 3, the riflescope 100 may also include various electronic components. For example, the riflescope 100 may include a battery 150 and a control module 152 (or computational system) which may include, among other things, a processor and memory. A display system 154 may be in communication with, or otherwise associated with, the control module 152. In some embodiments, the battery 150 and the control module 152 may be enclosed within the housing or body of the riflescope. In some embodiments, the battery 150 and/or the control module 152 may be coupled to an exterior portion of the riflescope 100. Additionally, while these components are schematically shown as being located at certain positions in FIG. 3 (i.e., with the battery shown near the objective system 102 and the control module 152 near the ocular system 104), such should not be considered limiting. Rather, the electronic components may be positioned at a variety of locations and may be incorporated in a variety of designs or configurations. For example, in one embodiment, the battery may be housed in a lever associated with a rotatable ring (e.g., the magnification ring 120) such as is described in U.S. patent application Ser. No. 15/458, 406 entitled GUN SCOPE WITH BATTERY COMPARTMENT and filed on Mar. 14, 2017, the entire disclosure of which is hereby incorporated by reference.

Various other electronic components may also be incorporated with or utilized in conjunction with the riflescope including, for example, various sensors, communications devices, input/output devices, etc. Non-limiting examples of electronic components and systems incorporated into or otherwise utilized with a riflescope are described U.S. Patent Application Publication No. 2015/0247702, published Sep. 3, 2015, the disclosure of which is hereby incorporated by reference in its entirety.

During use of the riflescope 100, the control module 152 may monitor one or more components of the riflescope, and/or one or more environmental parameters, and report the determined status of these components and parameters through the display system 154 to the user. This may enable the user to obtain the information provided by the control module 152 without have to remove their eye from the view through the riflescope 100 as presented through the eyepiece 140.

Referring again to FIG. 2, a partially exploded view of the elevation adjustment assembly 124 is shown, revealing a bolt 160 of the adjustment assembly that is configured such that a portion of the bolt extends through an opening 162 in the top of riflescope 100. The opening 162 shown in FIG. 2 may be generally rectangular in cross-sectional geometry, providing a keyed engagement with a similarly shaped portion of the bolt 160. Thus, the bolt 160 may translate along the rotational axis 132 of the elevation adjustment assembly 124, but may not rotate about the axis 132. While the opening 162 is shown as being rectangular, other shapes, geometries, and configurations may also be implemented instead of, or in addition to, a rectangle.

As shown in FIG. 3, the bolt 160 is also shown schematically as engaging the erector tube 116. As previously noted, rotation of knob 130 about axis 132 may cause bolt 160 to translate or move linearly along axis 132 without rotation thereabout, the bolt 160 thereby becoming displaced relative to the body of the riflescope 100 (e.g., relative to the main tube 104). This translational movement of bolt 160 may cause erector tube 116 and associated optical elements 118 to also move within the body of the rifle scope 100. Movement of erector system 114 within its allowed adjustment range causes a displacement of the aiming point (e.g., the reticle 122) within the riflescope 100. A similar arrangement may be used with other adjustment assemblies such as the windage adjustment assembly 128.

As will be appreciated by those of ordinary skill in the art, the adjustment assemblies may be configured such that the knobs (e.g., knobs 130 and 134) may include external markings that indicate the rotational position of knob relative to the riflescope 100. These markings may include, for example, hash marks, dots, post points, numbers, or other indicia (see, e.g., FIGS. 1-2). Additionally, the markings may include a "zero-mark" that may correspond to a specific point of aim configuration inside the riflescope 100. In some embodiments, considering the elevation assembly 124 as an example, the zero-mark may be at the lowest or a relatively low position and, when the knob 130 is rotated to the zero-mark, the knob 130 may be prevented from rotating any further in one direction. The markings may be associated with a particular unit of measure such as minute of angle (MOA) or a milliradian (MIL). Each marking may be configured to correspond to a specific amount of incremental adjustment (e.g., each marking may represent ⅛ MOA, ¼ MOA or ½ MOA or other appropriate increments). As will be appreciated by those of ordinary skill in the art, the adjustment assemblies may be configured to "click" or have a positive positioning at each marking (e.g., such as by use of a detent or similar mechanism in the adjustment assembly). In other words, the adjustment assemblies may snap into a unique rotational position when each incremental adjustment is reached such that a predetermined rotational force or must be applied to the knob in order to rotate the adjustment assemblies from one rotated position to the next. Thus, it is common, for example, to refer to the rotation of a knob through an increment of a single marking as "one click," or through four incremental markings as "four clicks," and so on. In other embodiments, the positioning of the knobs of the adjustment assemblies may depend on friction resistance, without a positive "click" or tactile bump to hold the knob in a desired rotational position.

Figure 4:
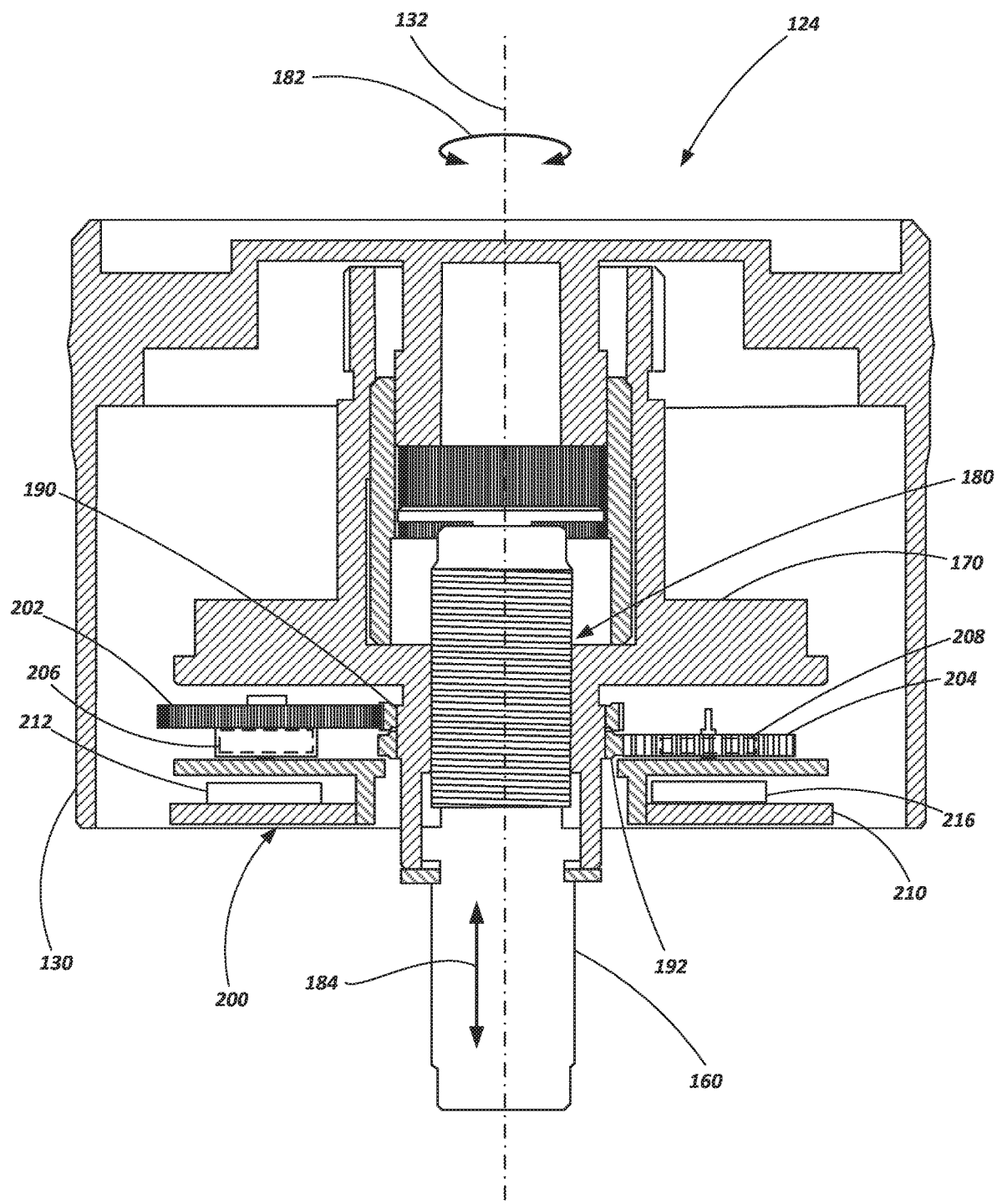
FIG. 4 is a partial cross-section of an adjustment assembly of a riflescope according to an embodiment of the present disclosure.
Figure 5:
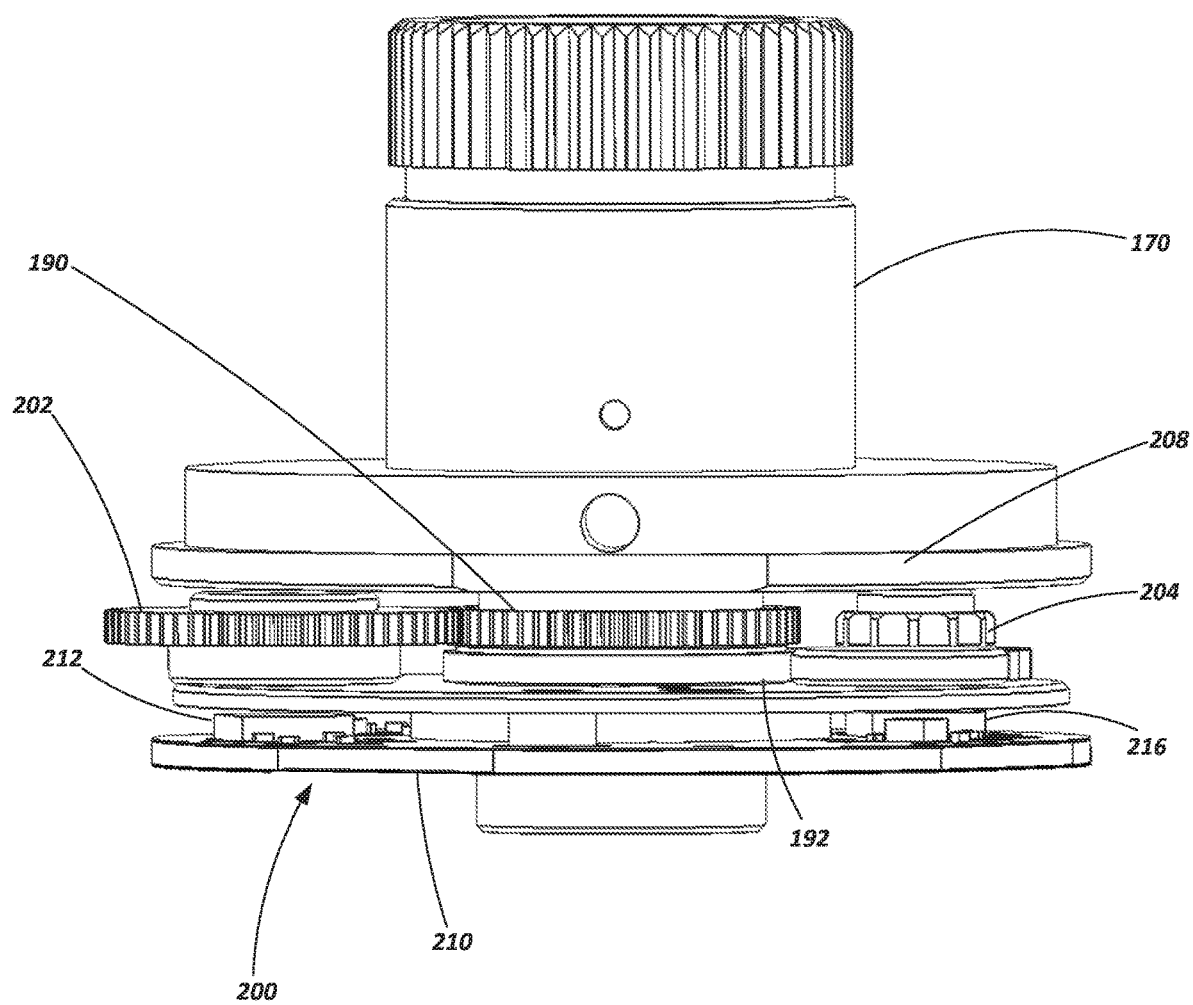
FIG. 5 is a front view of a portion of the adjustment assembly shown in FIG. 3.
Figure 6:
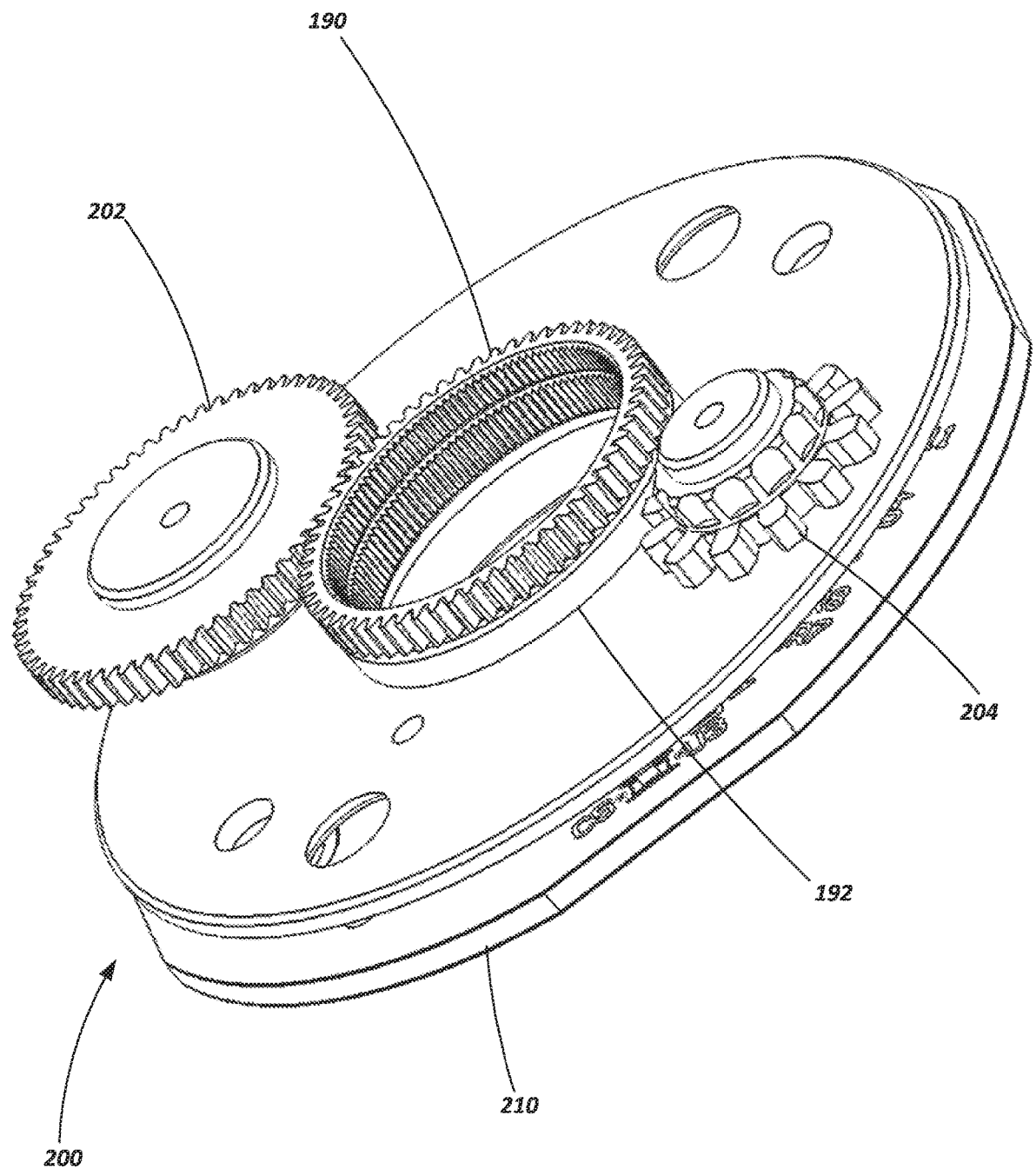
FIG. 6 is a perspective view of an encoder assembly used in a riflescope according to an embodiment of the present disclosure.
Figure 7:
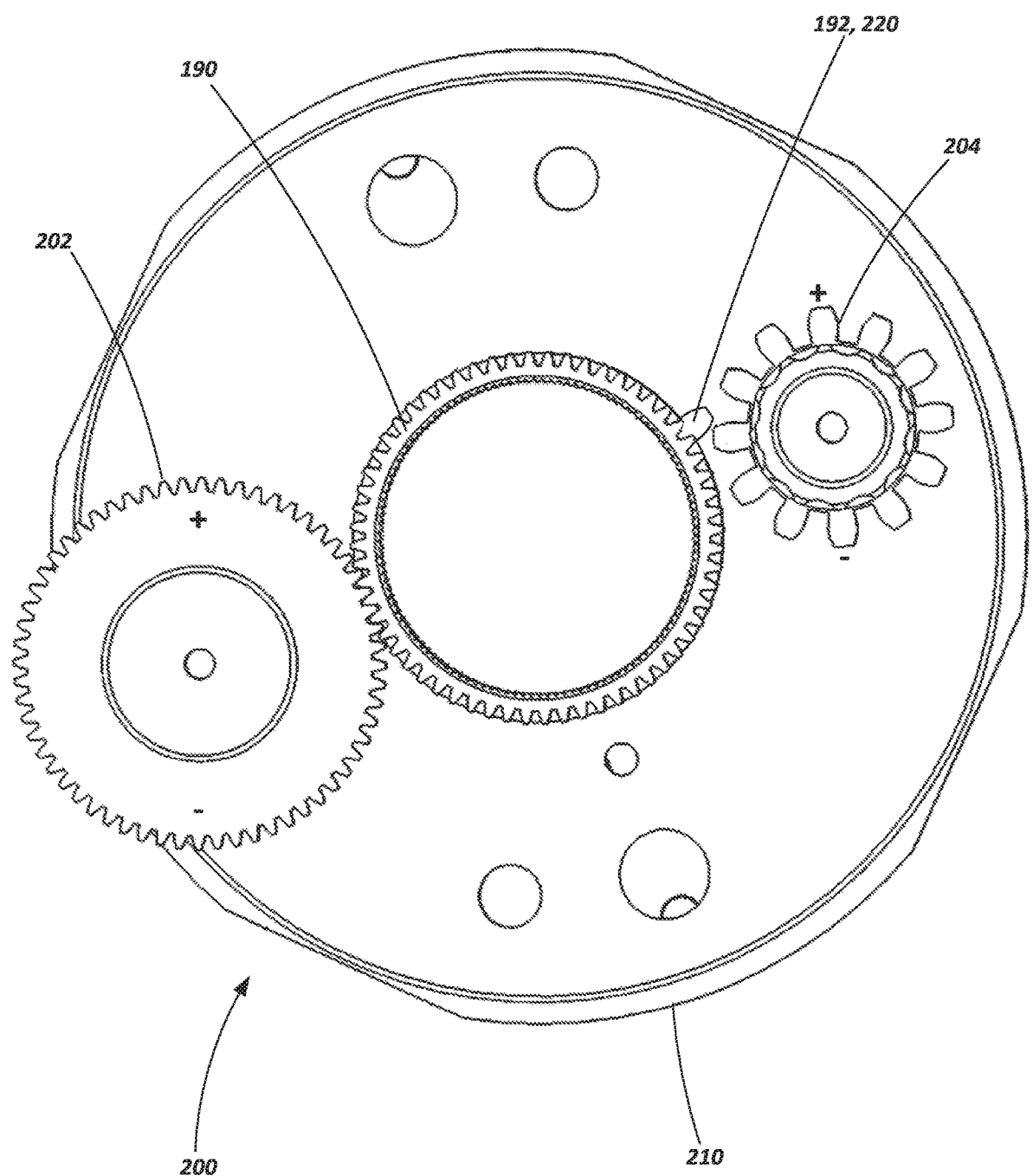
FIG. 7 is a top view of the encoder assembly shown in FIG. 5.
Figure 8:
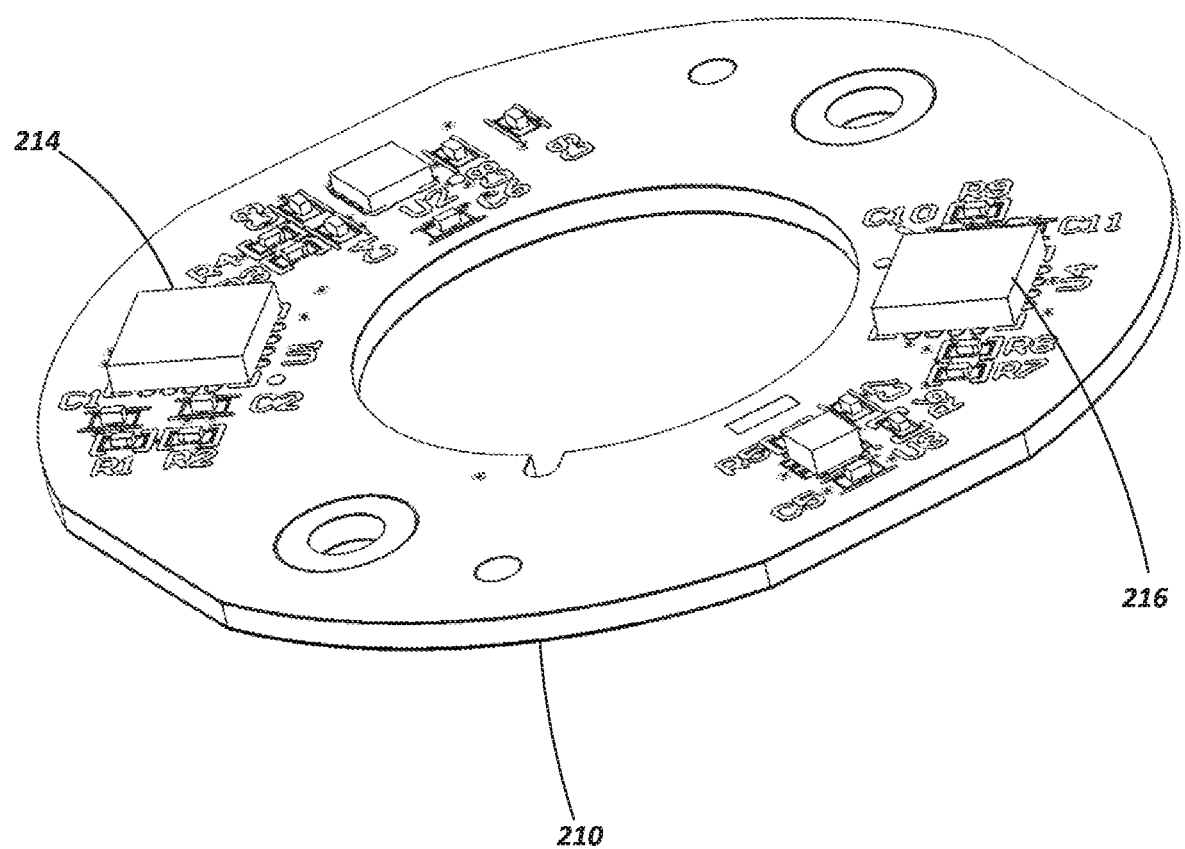
FIG. 8 is a perspective view of a portion of the encoder assembly according to an embodiment of the present disclosure.

Referring now to FIG. 4, a partial cross-sectional view is provided of an elevation adjustment assembly 124 according to one embodiment of the disclosure. The assembly 124 includes the knob 130, which may serve as a housing for many of the other components of the assembly 124, and a nut 170, which may be rotatably coupled with the knob 124. In one embodiment, the nut 170 may be selectively coupled to the knob 130 so that, when coupled, the two components rotate together about axis 132, but when decoupled, the knob may rotate about the axis 132 without concurrently rotating the nut 170. Such decoupling may be used, for example, to "zero" the knob 130 of the adjustment assembly 124 as will be appreciated by those of ordinary skill in the art. Such selective coupling and decoupling of the knob 130 from the nut 170 may be accomplished, for example, using a set screw or some other coupling mechanism.

With continued reference to FIG. 4, the elevation adjustment assembly 124 may further include the bolt 160 discussed hereinabove. The bolt 160 may include a threaded portion 180 which engages mating threads formed in a portion of the nut 170. The bolt 160 may be configured so that, when the nut 170 rotates about the axis 132 as indicated by directional arrow 182, the bolt 160 is kept from rotating about the axis 132 (e.g., by keyed engagement with the opening 162 (see FIG. 2) or other appropriate arrangement) and, thus, is translated or displaced along the axis 132 as indicated by directional arrow 184.

The adjustment assembly 124 may further include a first gear 190 coupled with the nut 170 and a second gear 192 coupled with the nut 170. The first and second gears 190, 192 may be coaxial and configured to rotate concurrently and concomitantly with the nut 170 about the axis 132. The first and second gears 190 and 192 may be configured as driving gears to interact with an encoder 200 which determines the rotational position of the nut 170 as will be described in further detail below.

Referring now to FIGS. 4-8, the encoder 200 may include a first gear, referred to as a position gear 202 which may engage and interact with the first gear 190 coupled with the nut 170. The encoder 200 further includes a second gear, referred to as a revolution gear 204, which may engage and interact with the second gear 192 coupled with the nut 170. The position gear 202 and the revolution gear 204 are configured as eccentric driven gears. Although FIGS. 4-8 depict components of the elevation adjustment assembly 124, the teachings of these figures and their related descriptions herein may be applied in parallax dial assembly 126 and windage adjustment assembly 128 in association with the adjustment of the either those assemblies 126 or 128 relative to axis 136.

In one embodiment, the position gear 202 and the revolution gear 204 may each house an associated diametrically magnetized component 206 and 208 (shown in dashed lines in FIG. 4). In other embodiments, the gears 202 and 204 may themselves be diametrically magnetized, or may otherwise be coupled with diametrically magnetized components that may rotate concentrically with the gears 202 and 204. The diametric magnetization of the gears 202 and 204 (or associated components) is indicated generally by "+" and "−" signs in FIG. 7. The diametric magnets or diametrically magnetized components may be referred to as a kind of rotational sensor when used in conjunction with a magnetic sensor (e.g., a Hall Effect sensor).

The encoder 200 may further include a circuit board 210 having various electronic components including, for example, a first Hall Effect sensor 212 placed adjacent to, and oriented generally parallel to, the position gear 202, and a second Hall effect sensor 214 placed adjacent to, and oriented generally parallel to, the revolution gear 204. The Hall Effect sensors 212 and 214 may be configured to determine the rotational position of their respective gears 202 and 204, based on the magnetic flux provided by the diametric magnets. It is noted that, while the currently described embodiments are described as including diametric magnets, other arrangements are also contemplated. For example, axial magnets may be utilized and arranged in conjunction with the Hall Effect sensors to provide detection of the various gears, or of other components described herein.

In one embodiment, the position gear 202 may be configured to have a 1:1 gear ratio with the first gear 190 coupled with the nut 170. Thus, for example, if the nut 170 is rotated about its central rotation axis 132 through an angle of 15 degrees, the position gear 202 likewise rotates through 15 degrees about its own central rotation axis (although in a counter or opposite rotational direction as compared to the nut 170). The same holds for any other angle of rotation of the nut 170 (e.g., a 359 degree rotation of the nut 170 results in a corresponding 359 degree rotation of the position gear 202). It is also noted that the first gear 190 and the corresponding position gear 202 may be configured such that rotation of the nut 170 in either direction (i.e., either clockwise or counterclockwise) about the axis 132 results in a corresponding rotation of the position gear 202 (in the opposite rotational direction as compared to the nut 170).

Thus, when the nut 170 is rotated from one position to another, the first Hall Effect sensor 212 may detect the change in magnetic flux from the diametric magnet associated with the position gear 202 and may determine the rotational position of the position gear 202 and, thus, the rotational position of the nut 170. In one particular embodiment, the first gear 190 and the associated position gear 202 may be configured such that there is one cog or gear tooth for each "click" of the knob 130 (e.g., for each marking on the associated knob). Thus, in various embodiments, the gears 190 and 202 may include a single cog for ⅛ MOA, ¼ MOA, ½ MOA or some other adjustment increment depending on the specific design of the adjustment assembly 124.

While the position gear 202 and associated sensor 214 may work together to determine the rotational position of the nut 170, if the knob 130 (and, thus, the nut 170) is rotated beyond 360 degrees (i.e., more than one full revolution), the position gear 202 and sensor 214 may not recognize the number of full rotations or revolutions. If for example, the knob 130 and nut 170 are rotated 375 degrees (one full revolution plus an additional 15 degrees), then the first sensor 214 may determine that the position gear 202 is at 15 degrees without accounting for the first 360 degrees of rotation.

Accordingly, the revolution gear 204 and associated sensor 216 may be configured to determine the number of revolutions or full rotations that the nut 170 has made about its rotational axis 132. For example, in one embodiment, the second gear 192 coupled with the nut 170 and the revolution gear 204 may have a gear ratio of something other than 1:1. For example, in one embodiment, the second gear 192 and the revolution gear 204 may have a rotational ratio of 12:1, meaning that 12 full revolutions of the second gear 192 are required for one full revolution of the revolution gear 204. In some embodiments, such a ratio may be accomplished through the design of the relative diameters of the gears (e.g., the diameters being a ratio of 1:12), or through the use of a gear reduction system utilizing one or more intermediate gears between the second gear 192 and the revolution gear 204. In one embodiment, such a ratio may be accomplished, at least in part, by including only a single cog or tooth 220 on the second gear 192 such that it only interacts with the revolution gear 204 once every revolution of the nut 170. This may best be seen in FIG. 7, wherein a single tooth 220 is shown on the second gear 192, and the revolution gear 204 includes 12 cogs or teeth. The example of a 1:12 or 12:1 ratio (depending on whether one is considering teeth ratios or relative revolution ratios) is not to be considered limiting, and other gear ratio configurations are contemplated wherein the revolution gear 204 includes a different number of cogs or teeth to provide another ratio. For example, another ratio may be used to correspond with the number of full revolutions required by the nut 170 to extend through the entirety of the total adjustment range of the nut 170 (e.g., the total linear range of the associated bolt 160).

Each time the nut 170 goes through a full revolution, the revolution gear 204 may rotate through a predetermined angle, depending on the defined gear ratio of the gears 192 and 204. The second sensor 216 may sense the position of the revolution gear 204 by the state of the corresponding magnetic flux. By tracking the rotational position of the revolution gear 204, combined with the rotational position of the position gear 202, the encoder 200 may determine the rotational position of the nut 170, including the number of full revolutions as well as the amount of any partial revolution.

Thus, considering the example discussed above wherein the nut 170 has been rotated 375 degrees from an initial rotational position (e.g., a zero point), the second sensor 216 may sense the rotational position of the revolution gear 204 to determine that the nut 170 has made one complete revolution from the starting point, while the first sensor 214 may sense the rotational position of the position gear 202 to determine that a point on the nut 170 is at an angular position or angular displacement of 15 degrees from the zero point. The encoder 200 may combine the information from both sensors 214 and 216 to determine the rotational position of the nut 170 to be at one full revolution plus 15 degrees, for a total rotation of 375 degrees. Similarly, the encoder may determine whether the nut 170 experiences multiple revolutions (e.g., two, three, or more) along with the absolute position of the nut 170 relative to the zero point through any additional partial revolution. In some embodiments, the absolute position of the nut 170 is always an angular measurement value less than 360 degrees since it is measured as an angular distance as measured from a zero point rather than an overall angular displacement over time.

In one embodiment, the encoder 200 may communicate the adjusted position information to the control module 152 which may provide the information to the display 154. Thus, a user may read the rotational position of an adjustment assembly without having to remove their eye from the view provided by the riflescope 100 to look at the markings on the knob of a given adjustment assembly.

It is noted that embodiments such as described above provide an advantage in being able to determine the rotational position of the adjustment assembly (e.g., the nut 170 and knob 130) including the number of full revolutions. Further, such is accomplished in device that is relatively small and capable of fitting in a limited space, such as an annulus defined between the nut and the knob or housing of the adjustment assembly.

As noted above, such may be accomplished by using a gear assembly where the revolution gear assembly exhibits a ratio of something other than 1:1 without having to have disparate size differences between the driving gear or the driven gear. For example, the driving gear (e.g., second gear 192) does not have to have a diameter that is 12 times smaller than the driven gear (e.g., revolution gear 204) in order to provide a 12:1 ratio between the two gears. More generally, the gear ratio is independent of, or not tied to, the diameter ratio of the driving gear and the driven gear. Stated another way, the gear ratio of the second gear and the revolution gear does not directly correlate to a ratio of the diameters of the second gear and the revolution gear. Thus, the directly driven gear (e.g., the revolution gear 204) can actually be smaller in diameter than that of the driving gear (e.g., second gear 192) even though the driven gear may only rotate a single full revolution for multiple revolutions of the driving gear. Additionally, the assembly does not need traditional gear reduction (i.e., a series of different sized gears) in order to achieve such a large ratio.

Figure 9:
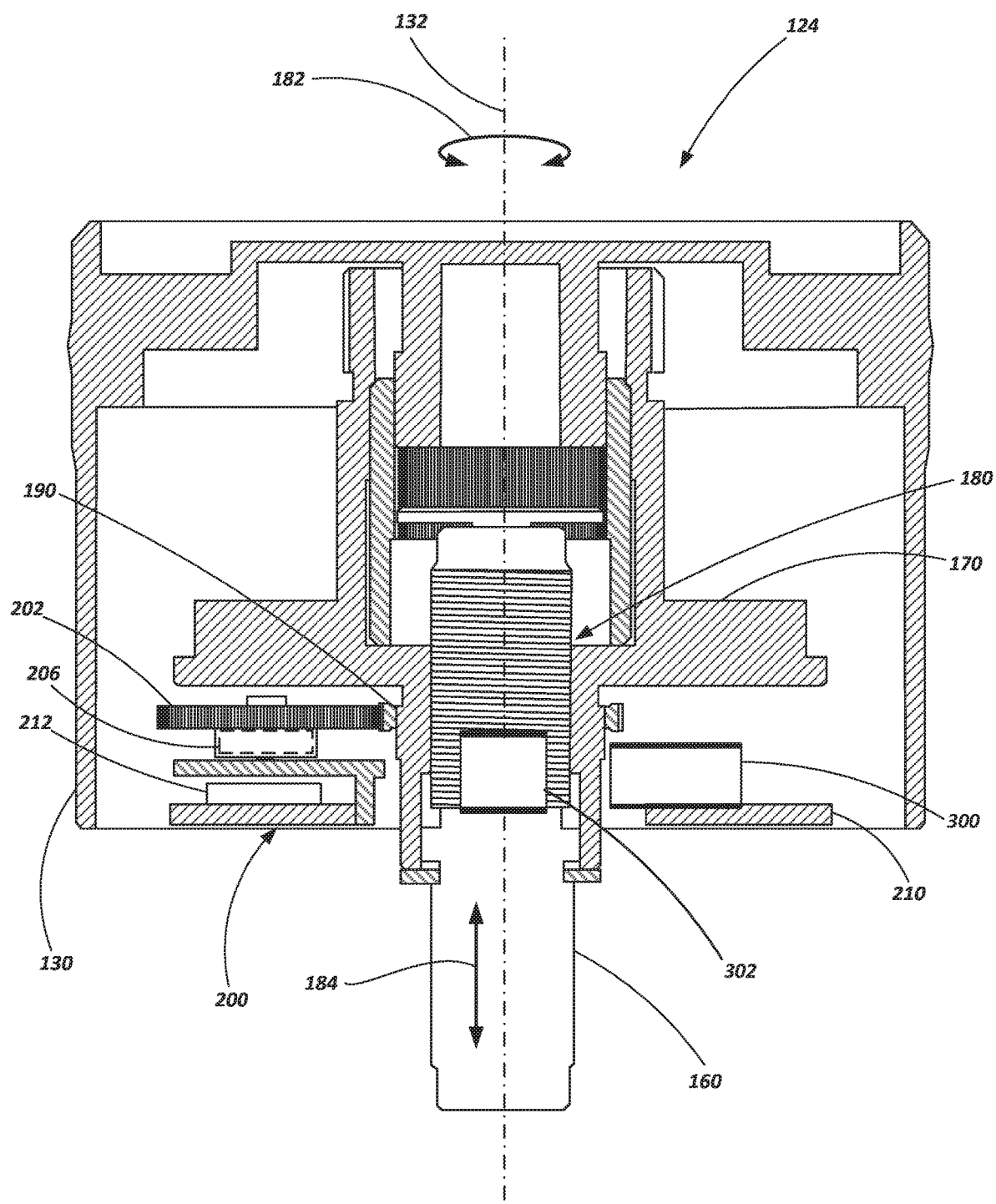
FIG. 9 is a partial cross-section of an adjustment assembly of a riflescope according to another embodiment of the present disclosure.

FIG. 9 shows a side cross-sectional view of another embodiment of the elevation adjustment assembly 124. In this embodiment, the adjustment assembly 124 comprises a nut 170 that lacks second gear 192 and a revolution gear 204. Thus, the first gear 190 is meshed with the position gear 202 to measure the absolute angular position of the nut 170 relative to the zero point such as discussed above, and the rotation of the position gear 202 is measured using the diametrically magnetized component 206 and the first Hall Effect sensor 212.

The circuit board 210 may also be connected to a magnetic sensor 300 (e.g., a second Hall Effect sensor or other magnetically sensitive transducer), and the bolt 160 may have a magnetic element 302 (e.g., a magnet or electromagnet) embedded or attached thereto. The magnetic sensor 300 may be configured to transduce a magnetic field emitted from the magnetic element 302. Changes in the magnetic field based on the linear position of the bolt 160 (and, thus, the linear position of the magnetic element 302) may be detected by the magnetic sensor 300 and then may be used to determine a measurement of the absolute or relative axial position or displacement of the bolt 160 relative to the nut 170 (e.g., absolute or relative movement along directional arrow 184) while the nut 170 rotates in place on the axis 132. Thus, the magnetic sensor 300 and magnetic element 302 may be used in conjunction to measure movement of the bolt 160 instead of, or in addition to, the encoding gears 190, 202. For example, the magnetic sensor 300 may detect the strength or orientation of the magnetic field of the magnetic element 302 in order to determine the linear distance between the magnetic sensor 300 and the magnetic element 302. That linear distance may correspond with a number of revolutions of the nut 170 since that number of revolutions may result in the bolt 160 (and magnetic element 302) moving a predetermined distance based on the threaded engagement between the bolt 160 and nut 170.

A full revolution of the nut 170 about its axis of rotation 132 may correspond to a specific linear displacement of the bolt 160 along the axis 132. For example, the threads of the bolt 160 and nut 170 may be sized and positioned so that the bolt 160 translates along the axis 132 between about 0.5 mm and about 1.5 mm, between about 0.8 mm and about 1.2 mm, or about one millimeter (or another predetermined distance) per revolution of the nut 170 relative to the bolt 160. Accordingly, the magnetic sensor 300 may detect the number of complete revolutions of the nut 170 by measuring the distance of translation of the bolt 160 relative to the nut 170 (i.e., the distance of translation of the magnetic element 302 along the axis 132 relative to the magnetic sensor 300), and the encoder may then convert the linear distance measured into a number of revolutions of the nut 170 about the axis 132.

In some configurations, the encoding gears 190, 202 may be used as a measurement of the value of the angular position of the bolt 160 offset from the zero point and combined with the information obtained from the magnetic sensor 302 to obtain the actual position of the nut 170 and bolt 160. For example, this may be used in some embodiments wherein the magnetic sensor 300 and magnetic element 302 have higher measurement error than the encoding gears 190, 202. Thus, the magnetic sensor and element 300, 302 may be used to determine a first measured range of the angular position of the bolt 160 (e.g., between about 10 degrees to about 350 degrees of its true angular position), and the encoding gears 190, 202 may be used to determine the angular position of the bolt 160 relative to the zero point within a second measured range (e.g., within about 10 degrees or less of its true angular position), wherein the first measured range of the angular position has greater error or variance (i.e., has less precision or accuracy) than the second measured range of the angular position for values less than about 1 revolution of the bolt 160. The first measured range of the angular position may be more accurate, more precise, or have less error or variance than the second measured range for values equal to or greater than about 1 revolution of the bolt 160. The offset from a zero point may be a positive or negative angular displacement value.

Thus, in some embodiments, at least two measurement systems (e.g., 300/302 or 192/204 and 190/202) may be implemented in the adjustment assembly 124, wherein one of the measurement systems (e.g., 300/302 or 192/204) may be more accurate in measuring complete revolutions of the bolt 160, and the other measurement system (e.g., 190/202) may be more accurate in measuring partial revolutions of the bolt 160. These two measurement systems may work together to detect the number of complete revolutions and the amount of a partial revolution in order to obtain the overall angular displacement of the bolt 160 relative to the nut 170.

Thus, the encoder may determine a total angular displacement of the nut 170, and the knob 130. This total angular displacement value may be based on the angular displacement of the nut 170 about the axis 132 relative to the zero point as measured by the first gear 190 on the nut and the encoding gear 202 and may be based on the angular displacement or number of complete revolutions of the nut 170 about the axis 132 as measured by the second gear 192 on the nut and the encoding gear 204. For example, the number of complete revolutions may be converted to an angular displacement value (e.g., 360 degrees of rotation per complete revolution), and that value may be added to the angular displacement offset from the zero point (e.g., the angular displacement of the nut 170 that is less than one complete revolution) to obtain the total angular displacement of the nut 170. That total angular displacement may be displayed or otherwise made visible to the user. For instance, that value may be displayed using display system 154 via a signal being sent to the controller and the controller causing the display system 154 to display a number or other visual indicia representative of the rotational position of the nut 170 or adjustment assembly 124.

In some embodiments, the total angular displacement value may be based on the angular displacement of the nut 170 about the axis 132 relative to the zero point as measured by the first gear 190 on the nut and the encoding gear 202 and may be based on the angular displacement or number of complete revolutions of the nut 170 about the axis 132 as measured by the magnetic sensor 300 which transduces linear displacement of the bolt 160 along the axis 132. Again, the complete revolutions may be converted into an angular displacement value, and that value may be added to the angular displacement offset from the zero point to obtain the total angular displacement of the nut 170. The total angular displacement may be displayed or otherwise made visible to the user.

Another aspect of the disclosure relates to a method comprising providing a riflescope (e.g., riflescope 100) having a main body (e.g., main tube 104) and an optical element (e.g., erector system 114 and/or its components) and coupling an adjustment assembly (e.g., at least one of the adjustment assemblies 124, 126, 128) to the riflescope, with the adjustment assembly being configured to adjust the optical element relative to the main body. For example, the adjustment assembly may be operated to change the position of the optical element within the main body by rotating or translating the optical element relative to the main body. Operation of the adjustment assembly may comprise rotating the adjustment assembly about an axis extending through the adjustment assembly, and that rotation may cause movement of the optical element.

Rotation of the adjustment assembly may be measurable by an encoder (e.g., 200) with the encoder having a first sensor to measure a first angular rotation value of the adjustment assembly about the axis and a second sensor to measure a second angular rotation value of the adjustment assembly about the axis. These first and second sensors may be embodied by the sensors described elsewhere herein, wherein the first angular rotation value is an angular displacement of the adjustment assembly less than one complete revolution about the axis or an absolute angle measurement relative to a zero point on the assembly or the riflescope. The second angular rotation value may be a number of complete revolutions about the axis or an overall total angular displacement equivalent to the number of complete rotations about the axis.

The method may also include configuring a total angular rotation of the adjustment assembly to be visible. For example, the total angular rotation may be displayed on a counter or screen based on combining the first and second angular rotation values measured by the first and second sensors.

It is noted that, in some embodiments, a magnetic sensor (e.g., magnetic sensor 300) and associated element (e.g., magnetic element 302) may be provided with sufficient resolution of accuracy to measure the actual angular position of the nut 170 without further aid of an additional sensor (e.g., a gear 202/sensor 212 combination). For instance, if the nut 170 is rotated and, by virtue of the threads, moves the bolt 160 1.5 millimeters relative to the magnetic sensor 300, and the bolt 160 moves 1 millimeter per revolution, the magnetic sensor 300 may determine that the nut 170 was rotated a total of 540 degrees (i.e., 360 degrees times 1.5).

It is further noted that the encoders may be used with other types of riflescopes and with adjustment assemblies of other designs. Some nonlimiting examples of other riflescopes and other adjustment assemblies are described in U.S. Patent Application Publication No. 2016/0040959, published Feb. 11, 2016, the disclosure of which is hereby incorporated by reference in its entirety.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A riflescope, comprising:
   a main tube;
   an objective system coupled to a first end of the main tube;
   an ocular system coupled to a second end of the main tube;
   an optical element disposed in the main tube;
   an adjustment assembly operable to alter a position of the optical element relative to the main tube, the adjustment assembly comprising:
      a rotational component configured to rotate about an axis;
      an encoder, the encoder including:
         a first gear engaging the rotational component;
         a first sensor to sense a rotational position of the first gear, the rotational position of the first gear correlating to an angular displacement of the rotational component about the axis relative to a zero point;
         a second gear engaging the rotational component; and
         a second sensor to sense a rotational position of the second gear, the rotational positon of the second gear correlating to complete revolutions of the rotational component about the axis;

wherein the encoder is configured to output a total angular displacement, the total angular displacement being based on the angular displacement of the rotational component about the axis relative to the zero point and the complete revolutions of the rotational component about the axis.

2. The riflescope of claim 1, wherein the first gear and the rotational component have a 1:1 gear ratio.

3. The riflescope of claim 1, wherein the first sensor is configured to sense an angular displacement having a value less than one revolution relative to the zero point.

4. The riflescope of claim 1, wherein the second gear and the rotational component have a gear ratio, the second gear ratio being independent of a ratio of a first diameter of the second gear and a second diameter of the rotational component.

5. The riflescope of claim 1, wherein the second gear rotates less than one full revolution for every full revolution of the rotational component.

6. The riflescope of claim 1, wherein:
the first gear engages a first portion of the rotational component;
the second gear engages a second portion of the rotational component, the second portion of the rotational component comprising only one tooth; and
the second gear comprising a plurality of teeth configured to engage the tooth of the second portion.

7. The riflescope of claim 1, wherein the second sensor comprises a magnetic sensor to sense a change in a magnetic field originating in the linear component or the rotational component.

8. The riflescope of claim 1, further comprising a knob, wherein the rotational component and the encoder are positioned within an interior portion of the knob.

9. The riflescope of claim 1, wherein the adjustment assembly is part of an elevational adjustment assembly, a windage adjustment assembly, or a parallax dial assembly.

10. The riflescope of claim 1, wherein the first gear is engaged with a first set of teeth of the rotational component and the second gear is engaged with a second set of teeth of the rotational component, the first set of teeth being offset along the axis relative to the second set of teeth.

11. The riflescope of claim 1, wherein the first and second gears each include diametric magnets.

12. The riflescope of claim 1, wherein at least the second sensor comprises a magnetic sensor to sense a change in a magnetic field through a linear component, the linear component being translatable along the axis in response to rotation of the rotational component.

13. The riflescope of claim 1, further comprising a control module and a display in communication with the control module, wherein the encoder is in communication with the control module and the display presents indicia representative of a rotational position of the rotational component about the axis.

* * * * *